United States Patent
Kuroki et al.

(10) Patent No.: US 11,818,153 B2
(45) Date of Patent: Nov. 14, 2023

(54) DETECTION DEVICE AND DETECTION PROGRAM

(71) Applicant: NIPPON TELEGRAPH AND TELEPHONE CORPORATION, Tokyo (JP)

(72) Inventors: Kotomi Kuroki, Musashino (JP); Yo Kanemoto, Musashino (JP); Kazufumi Aoki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 224 days.

(21) Appl. No.: 17/283,021

(22) PCT Filed: Apr. 23, 2019

(86) PCT No.: PCT/JP2019/017310
§ 371 (c)(1),
(2) Date: Apr. 6, 2021

(87) PCT Pub. No.: WO2020/075330
PCT Pub. Date: Apr. 16, 2020

(65) Prior Publication Data
US 2021/0344697 A1 Nov. 4, 2021

(30) Foreign Application Priority Data
Oct. 10, 2018 (JP) ................. 2018-192049

(51) Int. Cl.
*H04L 29/06* (2006.01)
*H04L 9/40* (2022.01)

(52) U.S. Cl.
CPC ...... *H04L 63/1425* (2013.01); *H04L 63/1416* (2013.01)

(58) Field of Classification Search
CPC ............ G06F 16/90335; G06F 21/556; G06F 16/183; H04L 69/16; H04L 63/145; H04L 63/1415; H04L 63/1425; G06Q 10/107
See application file for complete search history.

(56) References Cited

U.S. PATENT DOCUMENTS

| | | | |
|---|---|---|---|
| 8,239,952 B1* | 8/2012 | Oliphant | G06F 21/556 726/25 |
| 2008/0256218 A1* | 10/2008 | Kinoshita | H04N 21/2747 348/E7.071 |

(Continued)

OTHER PUBLICATIONS

Yamada et al., "Intrusion Detection for Encrypted Web Accesses", 21st International Conference on Advanced Information Networking and Applications Workshops (AINAW'07), Date of Conference: May 21-23, 2007.*

(Continued)

*Primary Examiner* — Morshed Mehedi
(74) *Attorney, Agent, or Firm* — XSENSUS LLP

(57) ABSTRACT

A regularization unit standardizes similar expressions across a plurality of URIs in access logs of requests made to a plurality of web servers, thereby changing the URIs into regularized URIs. A calculation unit calculates, among the access logs that are from the same source, the relative frequency of certain access logs to all access logs, the certain access logs corresponding to requests made to different destinations for the same regularized URI and also corresponding to certain response codes. If the largest of all the relative frequencies calculated for the regularized URIs is at least a certain threshold, a determination unit determines the regularized URIs to be scanning targets.

11 Claims, 10 Drawing Sheets

(56) References Cited

U.S. PATENT DOCUMENTS

| | | | |
|---|---|---|---|
| 2016/0112440 A1* | 4/2016 | Kolton | H04L 69/16 |
| | | | 726/1 |
| 2016/0335373 A1* | 11/2016 | Burd | G06F 16/90335 |
| 2019/0158513 A1* | 5/2019 | Shtar | G06F 16/183 |
| 2019/0215330 A1* | 7/2019 | Neuvirth | H04L 63/1425 |
| 2020/0014697 A1* | 1/2020 | Karin | G06N 20/00 |
| 2020/0195694 A1* | 6/2020 | Kalinin | G06Q 10/107 |
| 2020/0396239 A1* | 12/2020 | Kaidi | H04L 63/1416 |
| 2021/0105302 A1* | 4/2021 | Prakash | G06N 20/00 |

OTHER PUBLICATIONS

Goseva-Popstojanova et al., "Classification of Malicious Web Sessions" ICCCN, IEEE, 2012, 9 pages.

Kruegel et al., "A Multi-Model Approach to the Detection of Web-based Attacks", Computer Networks, 2005, pp. 1-22.

Cho et al., "SAD: Web Session Anomaly Detection Based on Parameter Estimation", Computers & Security, vol. 23, 2004, pp. 312-319.

Zhong et al., "An Actual Survey on Web Scanning by URI Co-occurrence Detection", Technical Report of the Institute of Electronics, Information and Communication Engineers, 2016, pp. 1-6 (20 pages including English Translation).

* cited by examiner

FIG.3

/phpMyAdmin2.1.1/setup.php
/phpMyAdmin3/setup.php          → /phpmyadmin/setup.php
/phpmyadmin3.1/setup.php
/phpmyadmin2/setup.php?param=xx

FIG.4

(a) ACCESS LOGS

| No. | SOURCE IP ADDRESS | DESTINATION IP ADDRESS | REGULARIZED URI | RESPONSE CODE |
|---|---|---|---|---|
| 1 | X.X.X.X | A.A.A.A | /phpmyadmin/setup.php | 404 |
| 2 | X.X.X.X | B.B.B.B | /phpmyadmin/setup.php | 200 |
| 3 | X.X.X.X | C.C.C.C | /phpmyadmin/setup.php | 404 |
| 4 | X.X.X.X | D.D.D.D | /phpmyadmin/setup.php | 404 |
| 5 | X.X.X.X | B.B.B.B | /scripts/setup.php | 404 |
| 6 | Y.Y.Y.Y | B.B.B.B | /phpmyadmin/setup.php | 200 |
| 7 | Y.Y.Y.Y | A.A.A.A | /index.php | 200 |

(b) SCORES FOR SOURCE IP ADDRESSES

| SOURCE IP ADDRESS | SCORE | ADDITIONAL NOTES |
|---|---|---|
| X.X.X.X | 0.6 (3/5) | No.1,3,4 |
| Y.Y.Y.Y | 0.0 (0/2) | NOT APPLICABLE |

(c) RESPECTIVE SCORES OF URIs (THRESHOLD: 0.5)

| REGULARIZED URI | SCORE OF URI | SOURCE IP ADDRESS |
|---|---|---|
| /phpmyadmin/setup.php | 0.6 | X.X.X.X (SCORE 0.6) Y.Y.Y.Y (SCORE 0.0) |
| /scripts/setup.php | 0.6 | X.X.X.X (SCORE 0.6) |
| /index.php | 0.0 | Y.Y.Y.Y (SCORE 0.0) |

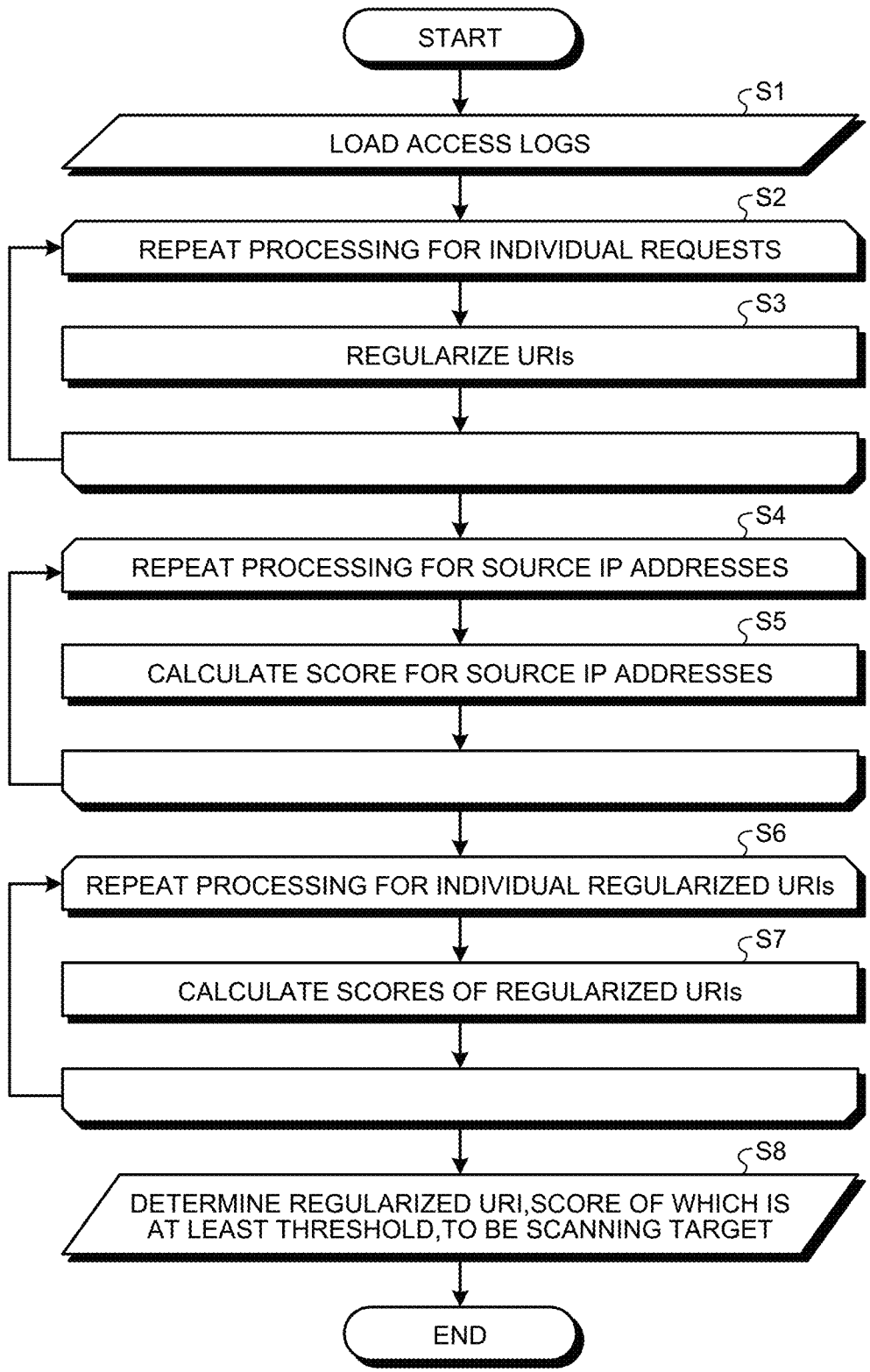

| URI SUBJECTED TO DETERMINATION |
| --- |
| /aaa/bbb/ccc/ |
| /aaa/ddd/eee/ |
| /fff |
| /ggg/hhh |

(b)

| APPLICATION NAME DB |
| --- |
| aaa |
| ggg |
| iii |

(c) OUTPUT RESULTS

| TARGET WEB APPLICATION | SCANNING TARGET URI |
| --- | --- |
| aaa | /aaa/bbb/ccc<br>/aaa/ddd/eee |
| ggg | /ggg/hhh |

(a)

DIRECTORY STRUCTURE OF CERTAIN
WEB APPLICATION "XXX"

(b)

| URI SUBJECTED TO DETERMINATION |
|---|
| /aaa/bbb/eee |
| /aaa/fff |
| /iii/ddd/eee/ |
| /ccc/bbb |

(c) OUTPUT RESULTS

| TARGET WEB APPLICATION | SCANNING TARGET URI |
|---|---|
| XXX | /aaa/bbb/eee<br>/aaa/fff |

DETECTION DEVICE AND DETECTION PROGRAM

CROSS-REFERENCE TO RELATED APPLICATIONS

The present application is based on PCT filing PCT/JP2019/017310, filed Apr. 23, 2019, which claims priority to JP 2018-192049, filed Oct. 10, 2018, the entire contents of each are incorporated herein by reference.

FIELD

The present invention relates to a detection device and a detection program.

BACKGROUND

An attacker who attempts to attack a web server may scan web applications to search for a vulnerable web server that can be a target of the attack. Scanning means an activity in which an attacker searches for the presence of a vulnerable web application based on a response to a request that the attacker made to the target web server for a Uniform Resource Identifier (URI) that is present in the vulnerable web application. Enabling early detection of such a scanning activity of an attacker makes it possible to identify a web application that has been set as a target by the attacker and implement a countermeasure.

Conventionally, a detection technique that is used in, for example, open source software (OSS) called Snort is known, which is based on signature matching. In this technique, scanning is detected using signatures acquired through observation of regular web traffics, honey pots, and the like. It is also known that HTTP response codes that correspond to malicious web accesses have certain features (see Non Patent Literature 1). Application of this knowledge makes it possible to detect scanning based on HTTP responses. For example, HTTP response codes that correspond to web accesses by scanning are, in most cases, 404, which means that "the page is not found". The technique is therefore configured to detect accesses as scanning when the response codes corresponding to the accesses are 404.

Also known are techniques for detecting abnormal web accesses, such as attacks, based on the order in which and the intervals at which web pages are accessed (see Non Patent Literatures 2 and 3). Application of such a technique makes it possible to detect, as scanning, accesses in which the order or the pattern of transition among web pages is substantially different from that observed when a normal user assesses web servers. Furthermore, a detection technique based on co-occurrences of URIs is also known (see Non Patent Literature 4). An attacker tends to request a plurality of web servers for the same URI from the same IP address when conducting scanning. This technique detects, as a scanning target, a URI that has co-occurred in accesses to a plurality of web servers.

CITATION LIST

Non Patent Literature 1: Katerina Goseva-Popstojanova, Goce Anastasovski, Risto Pantev, "Classification of malicious Web sessions", ICCCN, 2012

Non Patent Literature 2: Kruegel Christopher, Giovanni Vigna, William Robertson, "A multi-model approach to the detection of web-based attacks", In Computer Networks, 2005

Non Patent Literature 3: Sanghyun Cho, Sungdeok Cha, "SAD: web session anomaly detection based on parameter estimation", Computers & Security, 2004

Non Patent Literature 4: Yang Zhong, Shingo Orihara, Masaki Tanikawa, Hajime Shimada, Tutomu Murase, Hiroki Takakura, Yoshihito Oshima, "An Actual Survey on Web Scanning by URI Co-occurrence Detection", IEICE (Institute of Electronics, Information and Communication Engineers) Technical Report, 2016

SUMMARY

Technical Problem

However, such conventional techniques may fail to detect a scanning activity that needs to be detected and may result in erroneous detection. For example, the detection technique that is based on signature matching cannot detect scanning that has not been registered as a signature beforehand. The detection technique based on the HTTP response may erroneously detect a normal web access as scanning when the normal web access has resulted in an error. For example, erroneous detection can occur when a link destination within a web page is incorrect or when access is automatically attempted by a function of a web browser, as in the case of "/favicon.ico" or the like, regardless of whether there is a corresponding file or not.

The detection techniques that are based on the order in which and the intervals at which web pages are accessed can fail to detect scanning if an attacker adjusts the order in which pages are accessed or extend the intervals at which pages are accessed. The detection technique based on co-occurrence of URIs may erroneously detect, as scanning targets, URIs such as "/" and "/index.php" that are widely used on web servers in general.

With this detection technique, it is difficult to detect URIs that are scanning targets and targets of normal accesses at the same time.

The present invention has been made in view of the above inconveniences, and is aimed at detecting a scanning activity of an attacker with high accuracy.

Solution to Problem

To solve the above-described problem and to achieve an object, a detection device comprising:

a regularization unit configured to standardize similar expressions across a plurality of Uniform Resource Identifiers (URIs) in access logs of requests made to a plurality of web servers to change the URIs into regularized URIs;

a calculation unit configured to calculate, among the access logs that are from a same source, a relative frequency of certain access logs to all access logs, the certain access logs corresponding to requests made to different destinations for a same one of the regularized URIs and also corresponding to certain response codes; and a determination unit configured to, when largest of all the relative frequencies calculated for the regularized URIs is at least a certain threshold, determine the regularized URIs to be scanning target URIs.

Advantageous Effects of Invention

According to the present invention, a scanning activity of an attacker can be detected with high accuracy.

BRIEF DESCRIPTION OF DRAWINGS

FIG. 3 is an explanatory diagram for explaining processing in a regularization unit.

FIG. 4 is an explanatory diagram for explaining processing in a calculation unit and a determination unit.

FIG. 5 is a flowchart illustrating a detection processing procedure.

FIG. 9 is an explanatory diagram for explaining processing in an application name verification unit.

DESCRIPTION OF DRAWINGS

The following describes embodiments of the present invention with reference to the drawings. These embodiments are not intended to limit the present invention.

The drawings are illustrated with the same reference signs assigned to the same elements.

First Embodiment

System Configuration

Figure 1:
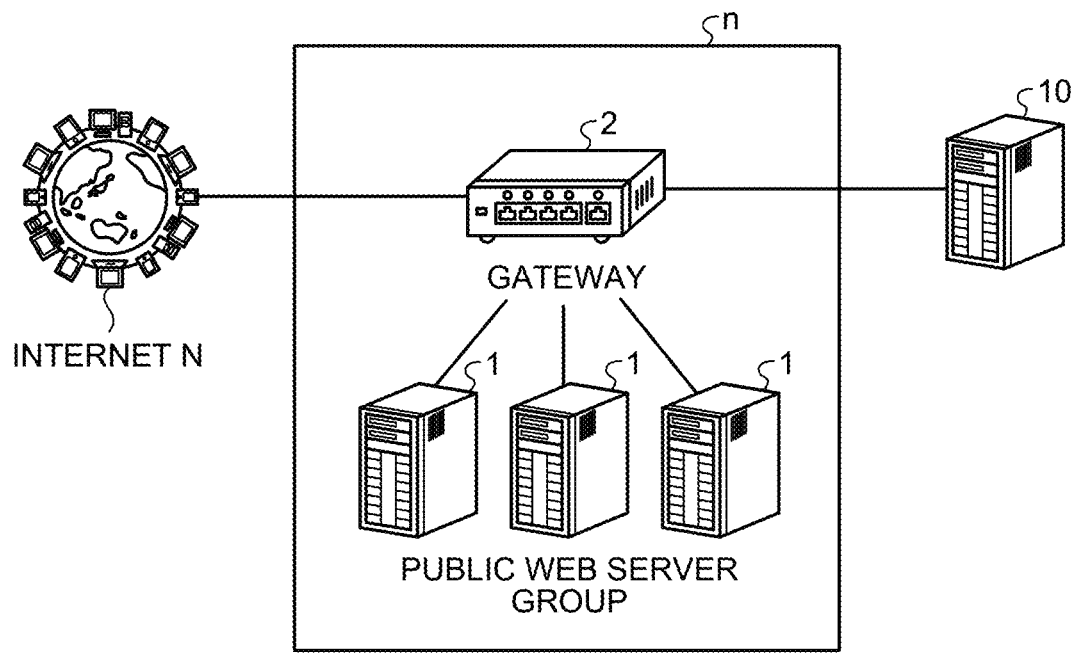
FIG. 1 is a diagram for explaining a system including a detection device according to the present embodiment.

FIG. 1 is a diagram for explaining a system including a detection device according to the present embodiment. Various web applications are made public through the Internet. A plurality of web servers 1 on which the web applications operate are built on a network n of an organization such as a company and are connected to the Internet N via a gateway 2, as illustrated in FIG. 1. A user accesses the web servers 1 via the Internet N to use the web applications.

In this system, a detection device 10 acquires, from the gateway 2 or the like, access logs of normal users and an attacker for accessing a group of the web servers 1 present on the same network and performs detection processing described below, thereby detecting a scanning activity of the attacker from the access logs.

Configuration of Detection Device

Figure 2:
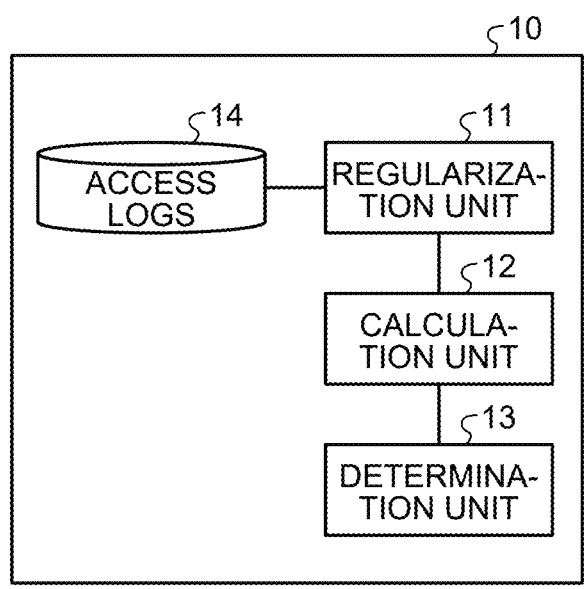
FIG. 2 is a schematic diagram exemplifying the schematic configuration of the detection device.

FIG. 2 is a schematic diagram exemplifying the schematic configuration of the detection device. In the detection device 10, a controller implemented using a central processing unit (CPU) of a general-purpose computer functions as a regularization unit 11, a calculation unit 12, and a determination unit 13 as illustrated in FIG. 2. These individual functional units or individual parts of these units may be individually implemented in different pieces of hardware.

In the detection device 10, access logs 14 are stored in a storage unit implemented by a semiconductor memory element such as a random access memory (RAM) or a flash memory, or a storage device such as a hard disk or an optical disc.

Herein, the access logs 14 are those acquired previously from, for example, the gateway 2 and accumulated and are a large number of HTTP access logs to the large number of web servers 1. Each of the access logs contains a source IP address that has made a request, a destination IP address, a URI for which the request has been made, and a response code corresponding to an access.

The regularization unit 11 standardizes similar expressions across two or more URIs in the access logs of requests made to the web servers 1, thereby changing the URIs into regularized URIs. Specifically, the regularization unit 11 standardizes differences in versions of web applications, whether characters are uppercase or lowercase, and so on, thereby performing regularization in which URIs that have similar expressions are standardized. This regularization enables the detection device 10 to perform processing thereafter on a certain unit by unit basis such as a web-application by web-application basis.

Herein, FIG. 3 is an explanatory diagram for explaining processing in the regularization unit 11. For example, as illustrated in FIG. 3, the regularization unit 11 deletes, in the URIs, all consecutive digits such as "2.1.1", "3", "3.1", which indicate the versions of the web applications. The regularization unit 11 also standardizes all uppercase alphabetic characters in the URIs into corresponding lowercase characters. Furthermore, the regularization unit 11 deletes, in the URIs, query parts that start from "?".

In the example illustrated in FIG. 3, the regularization unit 11 changes URIs such as "/phpMyAdmin2.1.1/setup.php", "/phpMyAdmin3/setup.php", "/phpmyadmin3.1/setup.php", and "/phpmyadmin2/setup.php?param=xx" into the same regularized URI "/phpmyadmin/setup.php".

The following description is given with reference back to FIG. 2. The calculation unit 12 calculates the relative frequency of certain access logs to all access logs among access logs from the same source and sets this relative frequency as a score for the corresponding source IP address, the certain access logs corresponding to requests made to different destinations for the same regularized URI and also corresponding to certain response codes. For example, the calculation unit 12 calculates, as the score for each of the source IP addresses, the relative frequency of certain access logs to all access logs among access logs that are from this source, the certain access logs corresponding to requests made to different destination IP addresses for the same regularized URI and also corresponding to the response codes of 300 or a higher number. Access logs corresponding to the response codes of 300 or a higher number mean access logs of requests that are not normal, which are likely to be scanning.

If the largest of all the scores calculated for the source IP address for the regularized URIs is at least a certain threshold, the determination unit 13 determines these regularized URIs to be scanning target URIs. For example, when the threshold is 0.5, if the score calculated for one of the regularized URIs is at least 0.5, the determination unit 13 determines the regularized URIs to be scanning target URIs.

Thus, the determination unit 13 determines a scanning activity by use of the largest of all the scores for the source IP address, whereby a scanning activity performed by a single attacker among a large number of normal users and giving a relatively high score can be detected.

Herein, FIG. 4 is an explanatory diagram for explaining processing in the calculation unit 12 and the determination unit 13. FIG. 4 exemplifies, in (a), access logs that have URIs regularized by the regularization unit 11. The calculation unit 12 first takes these access logs as subjects of the processing, and calculates the following as a score for each of the source IP addresses: the relative frequency of certain access logs to all access logs among the access logs that are from that source IP address, the certain access logs corresponding to requests for the same regularized URI and also corresponding to the response codes of 300 or a higher number.

For example, in a region a1 illustrated in (a) of FIG. 4, access logs are exemplified that correspond to requests made to different destination IP addresses for the same regularized URI "/phpmyadmin/setup.php" among access logs that correspond to the source IP address "X.X.X.X". In a region a2 illustrated in (a) of FIG. 4, response codes of 300 or a higher number among five access logs that correspond to the source IP address "X.X.X.X". In this case, the number of access logs that correspond to requests made to different destination IP addresses for the same regularized URI "/phpmyadmin/setup.php" and correspond to the response codes of 300 or a higher number is three. Therefore, the calculation unit 12 calculates the score for the source IP address "X.X.X.X" as 0.6, as illustrated in (b) of FIG. 4.

Likewise, among the two access logs that correspond to another source IP address "Y.Y.Y.Y" illustrated in (a) of FIG. 4, the number of access logs that correspond to requests made to different destination IP addresses for the same regularized URI and correspond to the response codes of 300 or a higher number is zero. Therefore, the calculation unit 12 calculates the score for the source IP address "Y.Y.Y.Y" as 0.0, as illustrated in (b) of FIG. 4.

In this case, as illustrated in (c) in FIG. 4, the determination unit 13 sets the largest of all the scores for the regularized URIs in the access logs that are from the same source IP address, as the respective scores of the regularized URIs. For example, the determination unit 13 calculates the score of the regularized URI "/phpmyadmin/setup.php", as 0.6, which is the largest of the score, 0.6, for the source IP address "X.X.X.X" and the score, 0.0, for the source IP address "Y.Y.Y.Y".

Thereafter, if the score of a regularized URI is at least a certain threshold, the determination unit 13 determines the regularized URI to be a scanning target URI. In the example illustrated in FIG. 4, the threshold is set to 0.5. Consequently, as illustrated in a region c1 in (c) of FIG. 4, the URIs "/phpmyadmin/setup.php" and "URI/scripts/setup.php" are determined to be scanning target URIs.

Detection Processing

Next, detection processing to be executed by the detection device 10 according to the present embodiment is described with reference to FIG. 5. FIG. 5 is a flowchart illustrating a detection processing procedure. The timing at which the flowchart in FIG. 5 is started is, for example, when a user inputs an operation for instruction to start the detection processing.

In the first place, the regularization unit 11 loads the access logs 14 in which destinations are on the web servers 1 (step S1), and sequentially repeats processing at step S3 on the individual access logs that indicate requests (step S2). In the processing at step S3, the regularization unit 11 standardizes similar expressions across two or more URIs in the access logs, thereby changing the URIs into regularized URIs. Specifically, the regularization unit 11 standardizes differences in versions of web applications, whether characters are uppercase or lowercase, and so on, thereby performing regularization in which URIs that have similar expressions are standardized.

Subsequently, the calculation unit 12 sequentially repeats the processing at step S5 on individual source IP addresses (step S4). In the processing at step S5, the calculation unit 12 calculates the relative frequency of certain access logs to all access logs among access logs from the same source and sets this relative frequency as a score for the corresponding source IP address, the certain access logs corresponding to requests made to different destinations for the same regularized URI and also corresponding to certain response codes. For example, the calculation unit 12 calculates, as the score for each of the source IP addresses, the relative frequency of certain access logs to all access logs among access logs that are from this source, the certain access logs corresponding to requests made to different destination IP addresses for the same regularized URI and not being normal for corresponding to the response codes of 300 or a higher number.

Subsequently, the determination unit 13 sequentially repeats processing of step S7 on the individual regularized URIs (step S6). In the processing at step S7, with respect to each of the regularized URIs, the determination unit 13 calculates, as the score of that regularized URI, the largest of all the scores calculated for the source IP addresses.

Subsequently, if the score of a regularized URI is at least a certain threshold, the determination unit 13 determines the regularized URI to be a scanning target URI (step S8). For example, if the score of a regularized URI is at least 0.5, the determination unit 13 determines the regularized URI is a scanning target URI. The detection device 10 outputs, to another device such as a display, URIs obtained as results of the determination. The sequence of the detection thereby ends.

As described above, in the detection device 10 according to the present embodiment, the regularization unit 11 standardizes similar expressions across two or more URIs in the access logs of requests made to the web servers 1, thereby changing the URIs into regularized URIs. The calculation unit 12 calculates the relative frequency of certain access logs to all access logs among the access logs from the same source IP address, the certain access logs corresponding to requests made to different destinations for the same regularized URI and also corresponding to certain response codes. If the largest of all the relative frequencies calculated for the regularized URIs is at least a threshold, the determination unit 13 determines the regularized URIs to be scanning target URIs.

The detection device 10 according to the present embodiment is thereby enabled to analyze scanning activities on a certain unit by unit basis such as a web-application by web-application basis. The detection device 10 is also enabled to determine a scanning activity by use of the largest of all the calculated relative frequencies and detect a scanning activity performed by a single attacker among a large number of normal users. Thus, the detection device 10 is enabled to detect a scanning activity of an attacker with high accuracy by, through combined use of co-occurrence of URIs and response codes, detecting scanning that cannot be detected conventionally and reducing erroneous detection.

Second Embodiment

Figure 6:
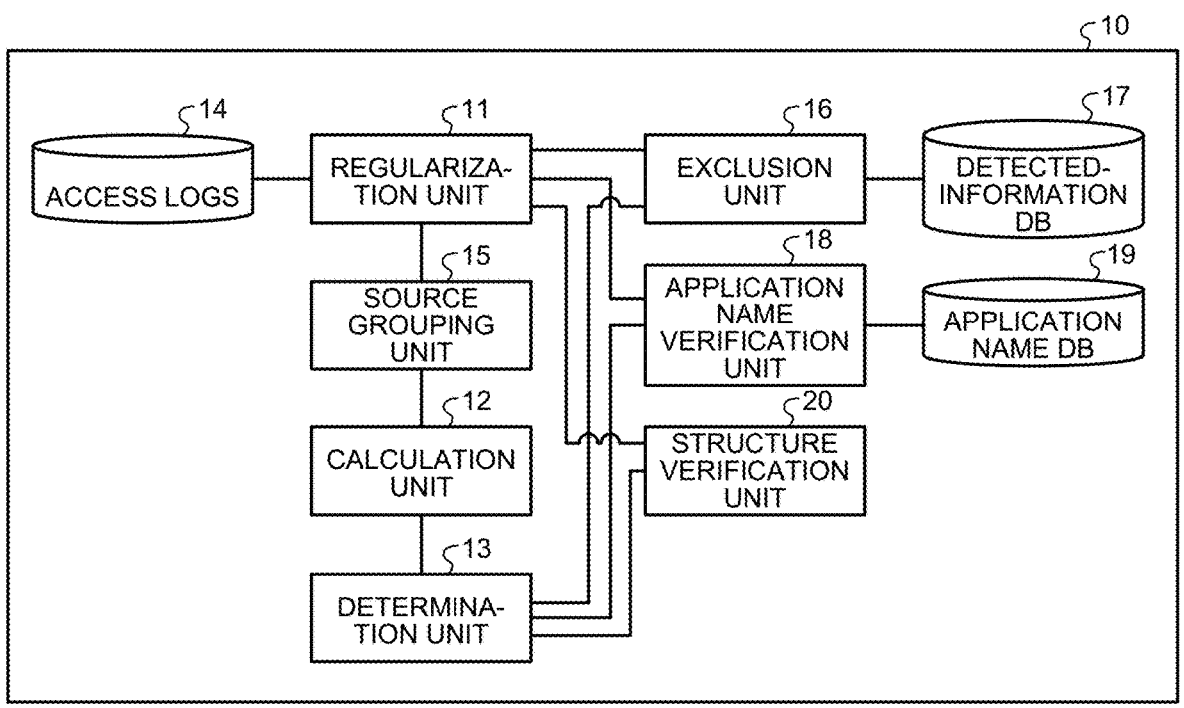
FIG. 6 is a schematic diagram exemplifying the schematic configuration of a detection device according to a second embodiment.

The detection device 10 according to the present invention is not limited to the above embodiment and may have a configuration that includes functional units described below in addition to the configuration (see FIG. 2) of the above embodiment. FIG. 6 is a schematic diagram exemplifying the schematic configuration of a detection device according to a second embodiment. As illustrated in FIG. 6, the controller of the detection device 10 according to the present embodiment includes a source grouping unit 15, an exclusion unit 16, an application name verification unit 18, and a structure verification unit 20 or some of these units. When the controller includes the exclusion unit 16, a detected-information DB 17 is stored in the storage unit. When the controller includes the application name verification unit 18, an application name DB 19 is stored in the storage unit. Descriptions of the functional units that are the same as those in the above embodiment are omitted.

With sets of regularized URIs formed so as that the individual sets can be formed of those in access logs of requests made by same source, if the degree of similarity between two of the sets is at least a certain threshold, the source grouping unit 15 places the different sources that correspond to the sets into the same group.

Specifically, in the first place, the source grouping unit 15 creates a list of regularized URIs for which requests have been made by each of the source IP addresses in the access logs. The source grouping unit 15 then uses, for example, mathematical formula (1) below to calculate the degree of similarity S between two sets of regularized URIs requested by two of the source IP addresses:

$$\text{Degree of Similarity } S = \frac{|U_x \cap U_y|}{|U_x \cup U_y|} \quad (1)$$

where:

$U_x$ denotes a set of regularized URIs for which requests have been made by an IP address $x$; and $U_y$ denotes a set of regularized URIs for which requests have been made by an IP address $y$ If the degree of similarity S is at least the certain threshold, the source grouping unit 15 assumes those source IP addresses as the same source and places those source IP addresses into the same group.

In that case, the calculation unit 12 calculates the scores for the source IP addresses by performing the above processing while assuming that sources placed in the same group are the same source. The detection device 10 is thereby enabled to detect a scanning activity when an attacker performs web scanning using two or more source IP addresses for different sets of destinations or using a botnet.

Figure 7:
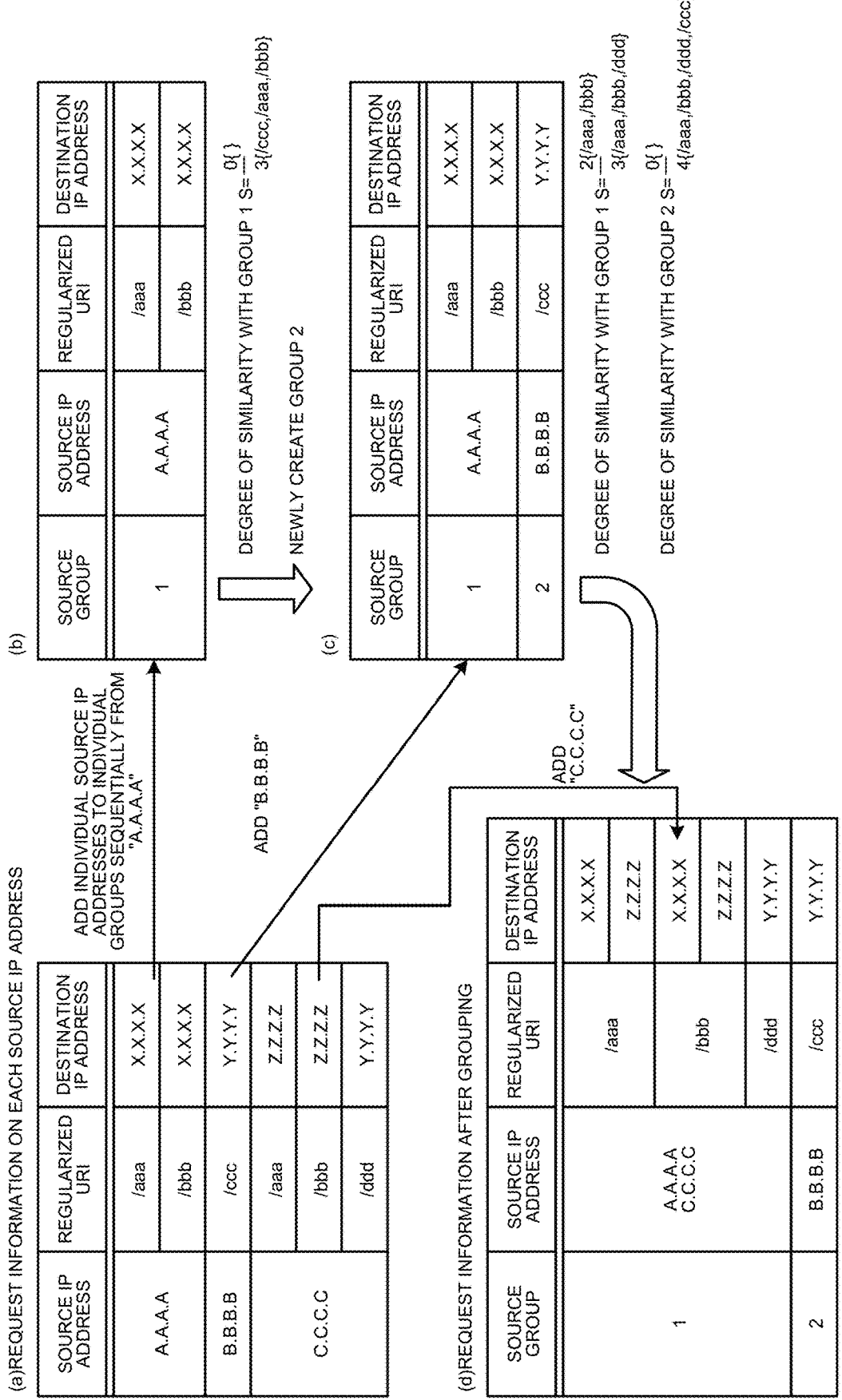
FIG. 7 is an explanatory diagram for explaining processing in a source grouping unit.

Herein, FIG. 7 is an explanatory diagram for explaining processing in the source grouping unit 15. As illustrated in (a) of FIG. 7, in the first place, the source grouping unit 15 creates a list of regularized URIs for which requests have been made by each of the source IP addresses in the access logs.

Subsequently, the source grouping unit 15 calculates the degree of similarity between sets of the regularized URIs in the lists for two of the source IP addresses, and, if the degree of similarity is at least the certain threshold, the source grouping unit 15 places those source IP addresses into the same group. If the degrees of similarity of one of the sets with two or more groups are at least the certain threshold, the source grouping unit 15 places a source IP address that corresponds to that one set into one of the two or more groups that has the highest degree of similarity therewith. If there are two or more groups corresponding to the highest degree of similarity with any one of the sets, the source grouping unit 15 places a source IP address that corresponds to that one set into all of the two or more groups.

For example, as illustrated in (b) in FIG. 7, the source grouping unit 15 creates a group 1 and places the source IP address "A.A.A.A" in the group 1. The source grouping unit 15 then calculates the degree of similarity of a set of regularized URIs requested by the source IP address "B.B.B.B" with a set of regularized URIs in the group 1.

In the example illustrated in (b) in FIG. 7, the set of regularized URIs in the group 1 is {/aaa, /bbb}, and the set of regularized URIs requested by the source IP address "B.B.B.B" is {/ccc}. Therefore, the degree of similarity S is calculated as 0/3 using mathematical formula (1) given above. When the threshold is set to ⅔, the calculated degree of similarity S is less than the threshold, and the source grouping unit 15 therefore places the source IP address "B.B.B.B" not into the group 1 but into a newly created group 2, as illustrated in (c) in FIG. 7.

Likewise, for the source IP address "C.C.C.C", the source grouping unit 15 calculates the degree of similarity S with the group 1 and the group 2. In the example illustrated in (c) in FIG. 7, a set of regularized URIs requested by the source IP address "C.C.C.C" is {/aaa, /bbb, /ddd} and a set of regularized URIs in the group 1 is {/aaa, /bbb}. Therefore, the degree of similarity S with the group 1 is calculated as 2/3. Furthermore, a set of regularized URIs in the group 2 is {/ccc}, and the degree of similarity S therewith is calculated as 0/4. Therefore, as illustrated in (d) in FIG. 7, the source grouping unit 15 places the source IP address "C.C.C.C" in the group 1 with which the degree of similarity S is at least the threshold.

Thus, the source IP address "A.A.A.A" and the source IP address "C.C.C.C", which have been placed in the same source group, are assumed as the same source. In this case, the calculation unit 12 calculates, as the above score for the source IP address of such a source, the score for the corresponding group.

Thus, if the degree of similarity between sets of regularized URIs in access logs of requests made by different sources is at least a certain threshold, the source grouping unit 15 places these different sources into the same group. In this case, the calculation unit 12 assumes that sources placed in the same group are the same source and calculates a relative frequency that is the score for the source. The detection device 10 is thereby enabled to detect a scanning activity with higher accuracy when an attacker performs web scanning using two or more IP addresses for different sets of destinations or using a botnet.

The following description is given with reference back to FIG. 6. The exclusion unit 16 excludes known scanning target URIs from URIs that have been determined to be scanning targets by the determination unit 13.

Figure 8:
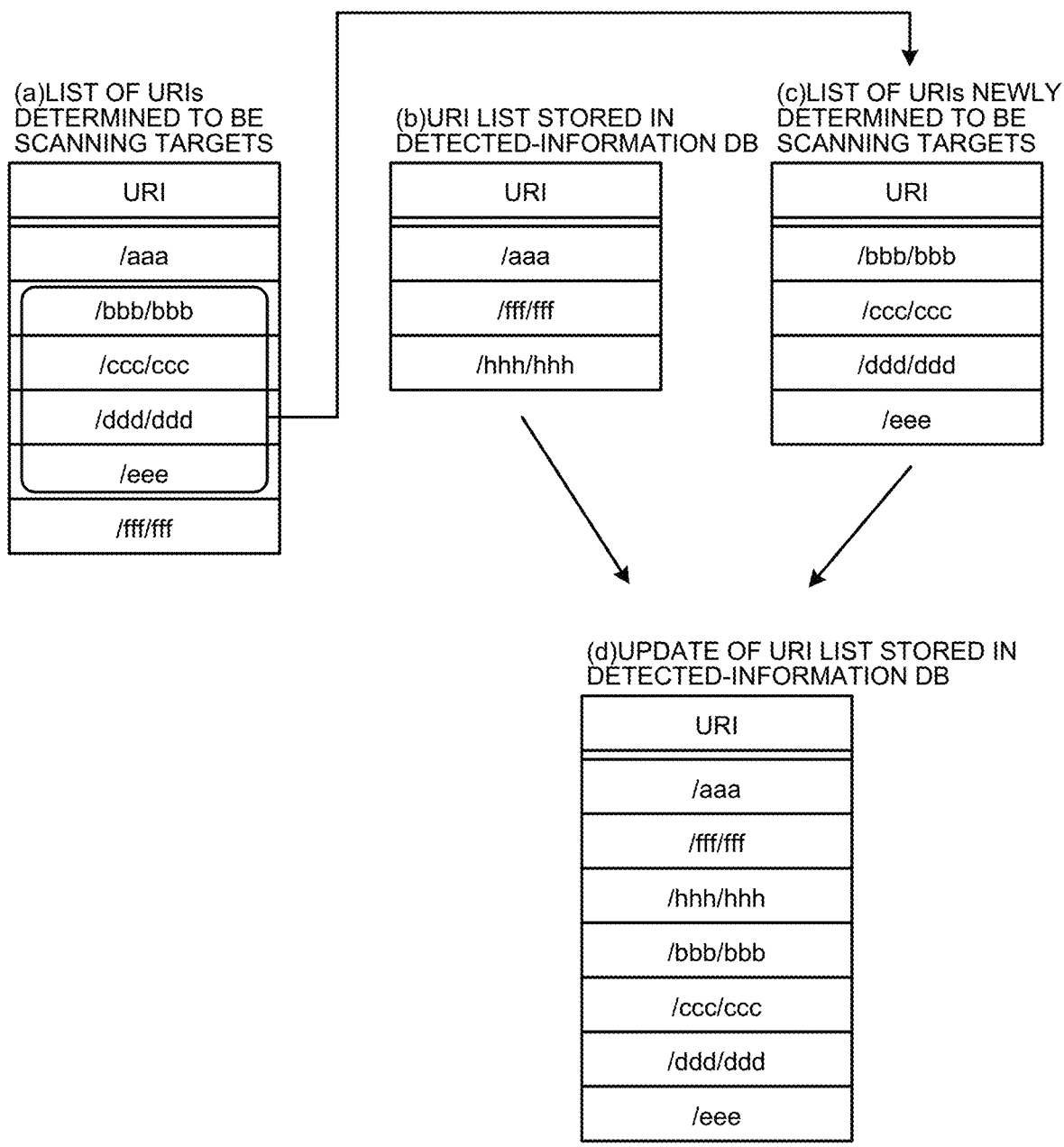
FIG. 8 is an explanatory diagram for explaining processing in an exclusion unit.

Herein, FIG. 8 is an explanatory diagram for explaining processing in the exclusion unit 16. As exemplified in (b) of FIG. 8, the detection device 10 has scanning target URIs stored in the detected-information DB 17 that have been determined to be scanning targets in the past or are found in known attack information.

Given this configuration, the exclusion unit 16 filters, using URIs in the detected-information DB 17 exemplified in (b) of FIG. 8, URIs exemplified in (a) of FIG. 8 that have been determined to be scanning targets by the determination unit 13. Consequently, the URIs that remain thereafter are unknown URIs that have been newly detected as scanning targets. Therefore, as exemplified in (c) of FIG. 8 the exclusion unit 16 can extract unknown scanning target URIs.

The exclusion unit 16 updates the detected-information DB 17, as illustrated in (d) of FIG. 8, using the extracted unknown scanning target URIs. In the example illustrated in FIG. 8, for example, a scanning target URI "/eee" that has been detected by the determination unit 13 has not been stored in the detected-information DB 17, and is therefore extracted as an unknown scanning target URI and newly stored in the detected-information DB 17.

Thus, the exclusion unit 16 excludes known scanning target URIs from URIs that have been determined to be scanning targets by the determination unit 13. The detection device 10 is thereby enabled to detect unknown URIs that have newly become scanning targets.

The following description is given with reference back to FIG. 6. If a URI determined to be a scanning target by the determination unit 13 has a known web application name therein, the application name verification unit 18 outputs the web application name.

Herein, FIG. 9 is an explanatory diagram for explaining processing in the application name verification unit 18. As illustrated in (b) of FIG. 9, the detection device 10 has a list of web application names stored in the application name DB 19 after acquiring the web application names from external information such as an open source software (OSS) information site. Upon acquisition thereof, the regularization unit 11 performs regularization on the acquired web application names. That is, the regularization unit 11 standardizes differences in version, whether characters are uppercase or lowercase, and so on across the web application names, as does across web applications in regularized URIs, in order to enable the web application names to be checked against regularized URIs.

The application name verification unit 18 then verifies whether any of the web application names in the application name DB 19 exemplified in (b) of FIG. 9 are included among URIs exemplified in (a) of FIG. 9 that have been determined to be scanning targets by the determination unit 13. If any of the web application names are included among the URIs that have been determined to be scanning targets, the application name verification unit 18 outputs the web application name thus included and the corresponding scanning target URI to a device not illustrated, such as a display or an external device, while associating these name and URI with each other, as exemplified in (c) of FIG. 9. The detection device 10 is thereby enabled to assume a web application that has become a scanning target.

In the example illustrated in FIG. 9, for example, scanning target URIs "/aaa/bbb/ccc/" and "/aaa/ddd/eee/", which have been detected by the determination unit 13, have therein a web application name "aaa" in the application name DB 19. Therefore, it is assumed that this web application "aaa" has become a scanning target.

Thus, if a URI determined to be a scanning target by the determination unit 13 has a known web application name therein, the application name verification unit 18 outputs the web application name. The detection device 10 is thereby enabled to assume a web application that has become a scanning target.

When a URI determined to be a scanning target by the determination unit 13 does not have a web application name therein, the application name verification unit 18 cannot identify the web application name thereof. In that cases, the detection device 10 according to the present embodiment is enabled to assume the web application name by the structure verification unit 20, which is described below.

The following description is given with reference back to FIG. 6. If a URI determined to be a scanning target by the determination unit 13 has the same directory structure as that for resources of a known web application, the structure verification unit 20 outputs the web application name of the web application.

Figure 10:
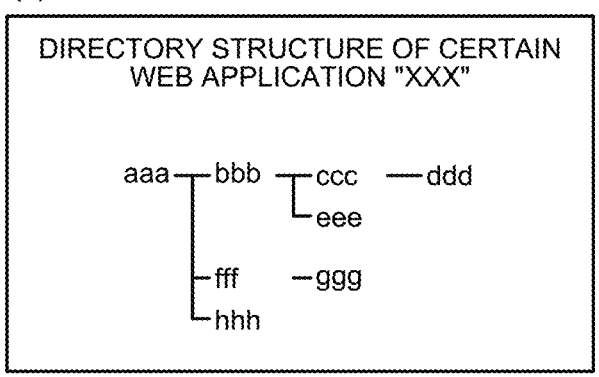
FIG. 10 is an explanatory diagram for explaining processing in a structure verification unit.

Herein, FIG. 10 is an explanatory diagram for explaining processing in the structure verification unit 20. The structure verification unit 20 acquires the directory structure of web application resources, as exemplified in (a) of FIG. 10, from external source code information such as an OSS information site. Subsequently, if any of the URIs exemplified in (b) of FIG. 10 that have been determined to scanning targets by the determination unit 13 has the same directory structure as the one exemplified in (a) of FIG. 10, the structure verification unit 20 assumes that URI as an URI on the web application.

In that case, the structure verification unit 20 outputs the web application name thereof and the corresponding scanning target URI to a device not illustrated, such as a display or an external device, while associating these name and URI with each other, as exemplified in (c) of FIG. 10. Thus, even when URIs do not have a web application names therein, the detection device 10 is enabled to assume a web application that has become a scanning target.

In the example illustrated in FIG. 10, for example, the directory structures of scanning target URIs "/aaa/bbb/ccc/" and "/aaa/fff" that have been detected by the determination unit 13 are the same as a directory structure for resources of a web application "XXX". Therefore, it is assumed that this web application "XXX" has become a scanning target.

Thus, if a URI determined to be a scanning target by the determination unit 13 has the same directory structure as that for resources of a known web application, the structure verification unit 20 outputs the web application name of the web application. The detection device 10 is thereby enabled to, even when URIs do not have a web application names therein, assume a web application that has become a scanning target.

Computer Program

It is also possible to produce a computer program in which processing to be executed by the detection device 10 according to each of the above embodiments is described in a computer-executable language. As one embodiment, the detection device 10 can be implemented by having a detection program that executes the above detection processing installed in a desired computer as package software or online software. For example, an information processing apparatus can be caused to function as the detection device 10 by having the above detection program executed by the information processing apparatus. Examples of the information processing apparatus mentioned herein include a desktop or notebook personal computer. Other examples of the information processing apparatus include mobile communication terminals such as a smartphone, a mobile phone, and a personal handyphone system (PHS), and slate terminals such as a personal digital assistant (PDA). Alternatively, the functions of the detection device 10 may be implemented on a cloud server.

Figure 11:
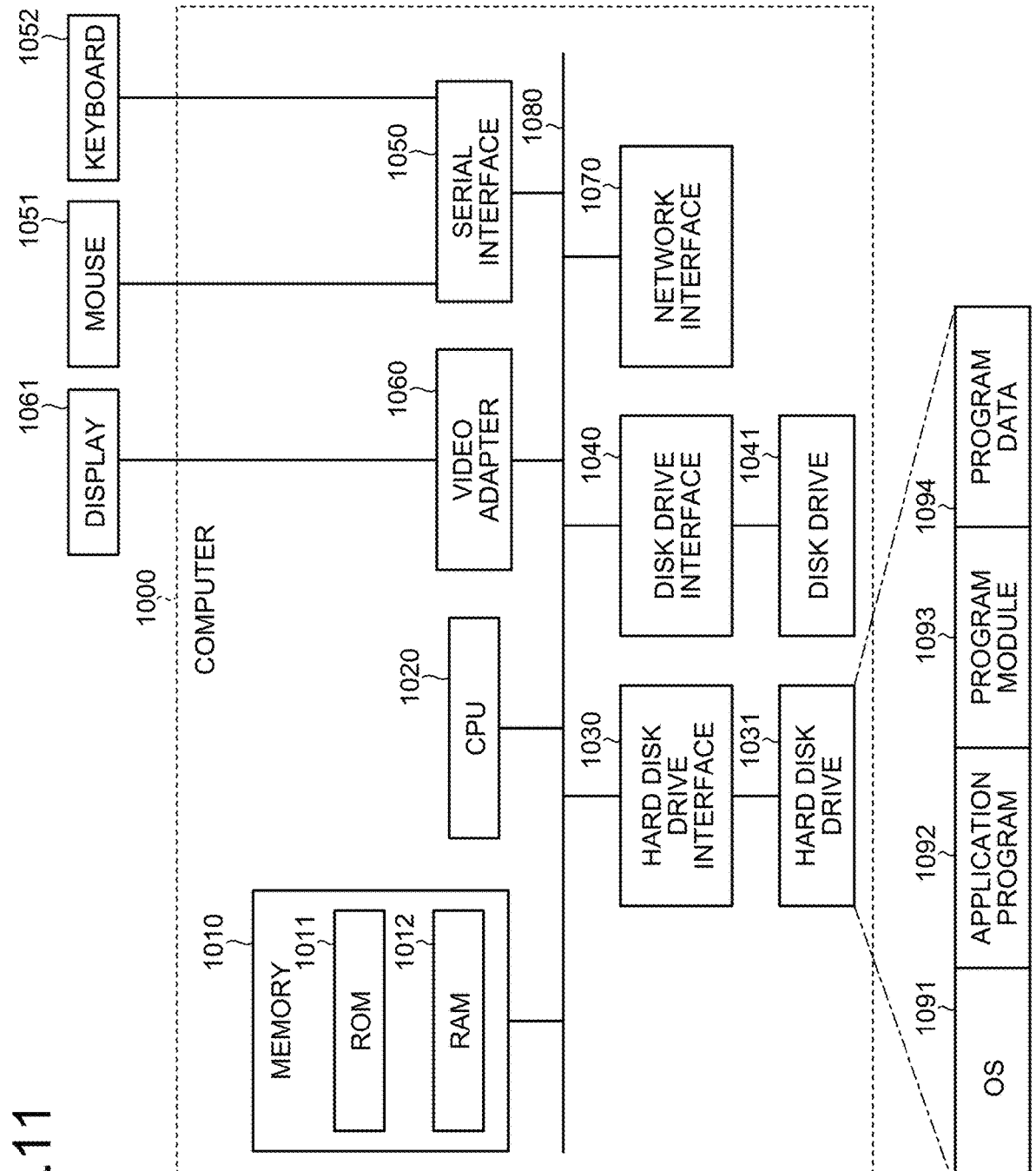
FIG. 11 is a diagram illustrating an example of a computer that executes a detection program.

FIG. 11 is a diagram illustrating an example of a computer that executes the detection program. A computer 1000 includes, for example, a memory 1010, a CPU 1020, a hard disk drive interface 1030, a disk drive interface 1040, a serial interface 1050, a video adapter 1060, and a network interface 1070. These members are connected to one another via a bus 1080.

The memory 1010 includes a read-only memory (ROM) 1011 and a random access memory (RAM) 1012. The ROM 1011 stores therein, for example, a boot program such as a basic input output system (BIOS). The hard disk drive interface 1030 is connected to a hard disk drive 1031. The disk drive interface 1040 is connected to a disk drive 1041. For example, a detachable storage medium such as a magnetic disk or an optical disc is inserted into the disk drive 1041. For example, a mouse 1051 and a keyboard 1052 are connected to the serial interface 1050. For example, a display 1061 is connected to the video adapter 1060.

Herein, the hard disk drive 1031 stores therein, for example, an operating system (OS) 1091, an application program 1092, a program module 1093, and program data 1094. The information described in each of the above embodiments is stored in, for example, the hard disk drive 1031 or the memory 1010.

The detection program is, for example, stored in the hard disk drive 1031 as the program module 1093 in which instructions to be executed by the computer 1000 are described. Specifically, the program module 1093 in which the processing to be executed by the detection device 10 described in each of the above embodiments is stored in the hard disk drive 1031.

Data that is used for information processing to be implemented by the detection program is stored, as the program data 1094 in, for example, the hard disk drive 1031. The CPU 1020 loads onto the RAM 1012, as necessary, the program module 1093 and the program data 1094 stored in the hard disk drive 1031, and executes the above individual procedures.

The program module 1093 and the program data 1094 associated with the detection program are not limited to being stored in the hard disk drive 1031, and, for example, may be stored in a detachable storage medium and be loaded by the CPU 1020 via the disk drive 1041 or the like. Alternatively, the program module 1093 and the program data 1094 associated with the detection program may be stored in another computer connected via a network such as a local area network (LAN) or a wide area network (WAN) and be loaded by the CPU 1020 via the network interface 1070.

While the embodiments to which the invention made by the present inventor is applied are described above, the present invention is not limited by the descriptions and the drawings that constitute parts of the disclosure of the present invention using the present embodiments. That is, all other embodiments, examples, and operational techniques that are made by those skilled in the art or the like based on the present embodiments fall within the present invention.

REFERENCE SIGNS LIST

10 DETECTION DEVICE
11 REGULARIZATION UNIT
12 CALCULATION UNIT
13 DETERMINATION UNIT
14 ACCESS LOG
15 SOURCE GROUPING UNIT
16 EXCLUSION UNIT
17 DETECTED-INFORMATION DB
18 APPLICATION NAME VERIFICATION UNIT
19 APPLICATION NAME DB
20 STRUCTURE VERIFICATION UNIT

The invention claimed is:

1. A detection method, comprising:
standardizing similar expressions across a plurality of Uniform Resource Identifiers (URIs) in access logs of requests made to a plurality of web servers to change the URIs into regularized URIs;
calculating, among the access logs that are from a same source, a relative frequency of certain access logs to all access logs; the certain access logs corresponding to requests made to different destinations for a same one of the regularized URIs and also corresponding to certain response codes; and
determining, when largest of all the relative frequencies calculated for the regularized URIs is at least a certain threshold, the regularized URIs to be scanning target URIs.

2. The detection method according to claim 1, further comprising excluding known scanning target URIs from URIs determined to be scanning targets by the determining.

3. The detection method according to claim 1, further comprising outputting, when a URI determined to be a scanning target by the determining has a known web application name therein, the web application name.

4. The detection method according to claim 1, further comprising outputting, when a URI determined to be a scanning target by the determination unit has a directory structure that is identical to a directory structure for resources of a known web application, a web application name of the web application.

5. The detection method according to claim 1, further comprising placing, with sets each being formed of the regularized URIs in the access logs from a corresponding source, when a degree of similarity between any two of the sets is at least a certain threshold, the different sources corresponding to the sets into a same group, wherein
the calculating calculates the relative frequencies while assuming that the sources placed in the same group are one same source.

6. A non-transitory computer-readable storage medium having stored thereon executable instructions, which when executed by circuitry, cause the circuitry to perform a method, the method comprising:
standardizing similar expressions across a plurality of Uniform Resource Identifiers (URIs) in access logs of requests made to a plurality of web servers to change the URIs into regularized URIs;
calculating, among the access logs that are from a same source, a relative frequency of certain access logs to all access logs, the certain access logs corresponding to requests made to different destinations for a same one of the regularized URIs and also corresponding to certain response codes; and
determining, when largest of all the relative frequencies calculated for the regularized URIs is at least a certain threshold, the regularized URIs to be scanning target URIs.

7. A detection device, comprising:
regularization circuitry configured to standardize similar expressions across a plurality of Uniform Resource Identifiers (URIs) in access logs of requests made to a plurality of web servers to change the URIs into regularized URIs;
calculation circuitry configured to calculate, among the access logs that are from a same source, a relative frequency of certain access logs to all access logs, the certain access logs corresponding to requests made to different destinations for a same one of the regularized URIs and also corresponding to certain response codes; and
determination circuitry configured to, when largest of all the relative frequencies calculated for the regularized URIs is at least a certain threshold, determine the regularized URIs to be scanning target URIs.

8. The detection device according to claim 7, further comprising:
exclusion circuitry configured to exclude known scanning target URIs from URIs determined to be scanning targets by the determination circuitry.

9. The detection device according to claim 7, further comprising:
 application name verification circuitry configured to, when a URI determined to be a scanning target by the determination circuitry has a known web application name therein, output the web application name.

10. The detection device according to claim 7, further comprising:
 structure verification circuitry configured to, when a URI determined to be a scanning target by the determination circuitry has a directory structure that is identical to a directory structure for resources of a known web application, output a web application name of the web application.

11. The detection device according to claim 7, further comprising:
 source grouping circuitry configured to, with sets each being formed of the regularized URIs in the access logs from a corresponding source, when a degree of similarity between any two of the sets is at least a certain threshold, place the different sources corresponding to the sets into a same group,
 wherein the calculation circuitry calculates the relative frequencies while assuming that the sources placed in the same group are one same source.

* * * * *